United States Patent [19]

Baeger

[11] Patent Number: 4,693,559
[45] Date of Patent: Sep. 15, 1987

[54] LIQUID-CRYSTAL CELL WITH DEPRESSIONS FOR WIDER VIEWING ANGLE

[75] Inventor: Holm Baeger, Schwalbach, Fed. Rep. of Germany

[73] Assignee: VDO Adolf Schindling AG, Frankfurt am Main, Fed. Rep. of Germany

[21] Appl. No.: 805,083

[22] Filed: Dec. 4, 1985

[30] Foreign Application Priority Data

Dec. 6, 1984 [DE] Fed. Rep. of Germany ....... 3444525

[51] Int. Cl.$^4$ ............................................. G02F 1/133
[52] U.S. Cl. ................................. 350/334; 350/347 R
[58] Field of Search ................... 350/341, 347 R, 334, 350/339 F

[56] References Cited

U.S. PATENT DOCUMENTS

| | | | |
|---|---|---|---|
| 4,333,708 | 6/1982 | Boyd et al. | 350/341 X |
| 4,398,803 | 8/1983 | Pohc et al. | 350/347 R X |
| 4,632,514 | 12/1986 | Ogawa et al. | 350/339 F |

Primary Examiner—John K. Corbin
Assistant Examiner—David Lewis
Attorney, Agent, or Firm—Martin A. Farber

[57] ABSTRACT

The invention covers a liquid-crystal cell having two transparent substrates 1 and 2 arranged at a distance from each other and forming between them a cell space 3 which is filled with liquid-crystal substance 8. Polarizers 5 are arranged on the sides of said substrates facing away from each other while electrodes 6 and 7 are arranged on the sides thereof facing each other. A substrate-side boundary surface of the cell space 3, along which surface the liquid-crystal surface 8 borders, is formed with a plurality of depressions 12 which substantially adjoin each other and, cover the entire boundary surface. Each depression 12 has places of different depth distributed over the extent of its surface, these depths producing light colors which correspond to the total thickness of the liquid-crystal layer 8 present at the respective places. The light colors have at least substantially the entire color spectrum in the region of the surface of a depression 12.

9 Claims, 1 Drawing Figure

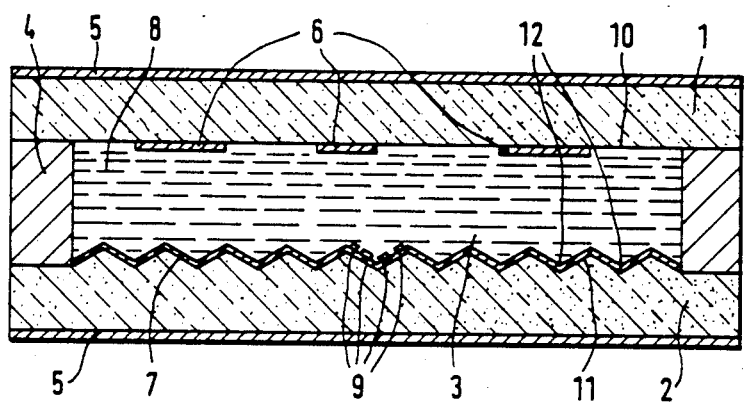

LIQUID-CRYSTAL CELL WITH DEPRESSIONS FOR WIDER VIEWING ANGLE

FIELD AND BACKGROUND OF THE INVENTION

The present invention relates to a liquid-crystal cell, particularly a TN-cell, having two transparent substrates which are arranged spaced apart from each other and form between each other a cell space filled with liquid crystal substance, polarizers being arranged on the sides of said substrates which face away from each other and electrodes on the sides facing each other.

In such liquid-crystal displays, the problem exists of arranging the two substrates with the smallest possible deviations in tolerance in their distance apart. Deviations in this distance, by which the liquid-crystal layer is determined, lead to a coloring of the display. Particularly in the case of large-area displays it is difficult to obtain a uniform distance apart over the entire area.

Furthermore, the spacing must also be of a specific size in order to obtain one color for the display.

These color problems become particularly severe if colored characters and symbols are to be displayed, for instance by a colored backing at given places of the display, since erroneous mixtures of color can easily occur.

SUMMARY OF THE INVENTION

It is therefore the object of the invention to create a liquid-crystal cell having the foregoing construction which makes a uniform color of the display possible while being simple and easy to construct.

This object is achieved according to the invention in the manner that a boundary surface of the cell space on the substrate side which is adjoined by the liquid-crystal substance is developed with a plurality of depressions which adjoin each other and substantially cover the entire boundary surface. The depressions have depths which vary over the extent of the surface at the place of each depression, and produce light colorations corresponding to the total thicknesses of the liquid-crystal layer present at each of these places. The light colorations have at least substantially the entire color spectrum in the region of the extent of the surface of a depression.

Since the coloration of each depression has substantially the entire color spectrum, both the region of each depression and the entire display surface are perceptible in a single color by an observer, due to additive color mixing. As a result of the small size of the depressions, they are not individually visible.

The wall surfaces of a depression have a different inclination to the display surface over the extent of the surface of the depression, as a result of which the individual liquid-crystal molecules adjoining same have a starting position of different inclination. This leads to a different tilt characteristic of these liquid-crystal molecules, as a result of which the legibility of the display from all angles of view is considerably improved.

The switch times of liquid-crystal displays are dependent on the thickness of the liquid-crystal layer, larger thicknesses permitting only sluggish switching while slight thicknesses permit rapid switching. Thin liquid-crystal layers entail, however, to an increased extent, the problem of, in particular, non-uniform discoloring. Since, as a result of the development in accordance with the invention, the discoloration problem is eliminated, liquid-crystal displays of small thickness of liquid-crystal layer and thus short switch times can now be produced without difficulty.

The elimination of the discoloration problems now also simplifies the production of flexible displays.

In addition to this, changes in temperature can no longer—in contradistinction to traditional displays—lead to changes in the neutral coloring of the display.

The liquid crystal cell is easy to produce if the depressions, developed on the cell space side of the substrate, are at least partially covered by electrodes since, in this stage of construction the other thin layers of the cell have not yet been applied to the substrate so that they could be damaged. This is true in particular for very fine structures of the electrodes, which are very sensitive. Since the subsequently applied layers are very thin, the structure of the depressions is retained up to the boundary surface which is adjoined by the liquid-crystal substance. The depressions can be produced, for instance, by etching or embossing.

Another possibility of construction, which is also advantageous, consists of applying to the cell-space side of the substrate a transparent layer whose cell-space side surface has a roughness which forms the depressions. In this connection it is also possible that the transparent layer be applied, so as to cover the electrodes.

The extent of the surface of a depression may be of such a size that its light colors appear as neutral additive color mix, the color mix being preferably gray.

Either one or both substrate-side boundary surfaces of the cell space can be developed with a plurality of depressions.

BRIEF DESCRIPTION OF THE DRAWING

One embodiment of the invention is shown in the drawing and will be described in further detail below. The sole FIGURE of the drawing is a cross section through a liquid-crystal cell.

DETAILED DESCRIPTION OF THE PREFERRED EMBODIMENT

The liquid-crystal cell shown in the FIGURE comprises two transparent substrates 1 and 2 arranged spaced from each other, forming a cell space 3 between them. The cell space 3 is closed all around on its sides by a closure 4. Polarizers 5 are positioned on the substrates 1 and 2 on the sides thereof which face away from each other.

Symbol electrodes 6 are arranged on the cell-space-side surface 10 of the substrate 1 and a surface electrode 7 is arranged on the cell-space-side surface 11 of the substrate 2. The cell space 3 is filled with liquid-crystal substance 8, four liquid-crystal molecules 9 of which are shown next to the surface electrode 7.

The entire surface 11 of the substrate 2 is provided with depressions.

Since the surface electrode 7 is very thin, the same depressions 12 are present on its free surface which forms the boundary surface with the liquid-crystal substance 8.

Over the extent of its surface, each depression 12 has places of differing depth. In this connection the slightest depth is at the edge and the greatest depth in the center of the depression 12.

This difference in depth produces the result that at each of the places of the depression 12 a layer of liquid-crystal substance of different thickness is present. At each place a given color is produced corresponding to the specific thickness of the layer of liquid-crystal substance, the different depths being so selected that substantially the entire color spectrum is present within a depression 12.

In view of the small size, however, it is not the colors individually but rather a neutral additive color mix of gray color which is perceptible to an observer. This is true in the case of all depressions 12 so that the display as a whole appears uniformly gray.

Since the entire color spectrum within a depression 12 remains present at all times regardless of variations in the total thickness of the layer of liquid-crystal substance, there cannot be any changes in color.

I claim:

1. In a liquid-crystal cell, particularly a TN-cell, having two transparent substrates arranged spaced from each other and forming between each other a cell space filled with liquid-crystal substance, polarizers positioned on sides of said substrates facing away from each other, and electrodes located on the sides facing each other, the improvement wherein a substrate-side boundary layer of the cell space contiguous the liquid-crystal substance is formed with a plurality of depressions adjoining each other, said depressions covering substantially the entire boundary surface and having different depths at different places distributed over the extent of the surface of each depression, said depths constituting means for producing light colors corresponding to the total thicknesses of the layer of liquid-crystal present respectively in each of said places, and wherein the light colors include substantially the entire color spectrum within the region of the extent of the surface of each depression.

2. The liquid-crystal cell according to claim 1, wherein said depressions are formed on the cell space side of the substrate and are at least partially covered by said electrodes.

3. The liquid-crystal cell according to claim 2, wherein said depressions have an inclined surface and are produced by an etching process.

4. The liquid-crystal cell according to claim 2, wherein said depressions have an inclined surface and are produced by an embossing process.

5. The liquid-crystal cell according to claim 1, further comprising a transparent layer disposed on the cell-space side of the substrates, said cell-space surface of said transparent layer having a roughness which provides said depressions.

6. The liquid-crystal cell according to claim 5, wherein said transparent layer covers said electrodes.

7. The liquid-crystal cell according to claim 1, wherein the surface of a depression extends to such a size that the light colors appear as a neutral additive color mix.

8. The liquid-crystal cell according to claim 7, wherein said color mix is gray.

9. The liquid-crystal cell according to claim 1, wherein both substrate-side boundary surfaces of the cell space are formed with a plurality of depressions.

* * * * *